United States Patent [19]

Nagaoka et al.

[11] Patent Number: 5,554,677
[45] Date of Patent: Sep. 10, 1996

[54] BLOW-MOLDED ARTICLE MADE FROM THERMOPLASTIC RESIN COMPOSITION

[75] Inventors: Kenji Nagaoka; Hiroshi Hagimori; Kaoru Kitadono, all of Ichihara, Japan

[73] Assignee: Sumitomo Chemical Company, Limited, Osaka, Japan

[21] Appl. No.: 400,391

[22] Filed: Mar. 7, 1995

Related U.S. Application Data

[63] Continuation of Ser. No. 200,105, Feb. 22, 1994, abandoned, which is a continuation-in-part of Ser. No. 72,959, Jun. 8, 1993, abandoned.

[30] Foreign Application Priority Data

Jun. 9, 1992 [JP] Japan ..................... 4-149215

[51] Int. Cl.$^6$ ............... C08J 5/10; C08K 3/40; C08L 71/12
[52] U.S. Cl. .............. 524/494; 524/514; 524/529; 524/540; 525/66; 525/68; 525/905; 525/397
[58] Field of Search ................. 524/494, 508, 524/514, 529, 531, 538, 540; 525/66, 68, 92, 132, 149, 397, 905

[56] References Cited

U.S. PATENT DOCUMENTS

| | | | |
|---|---|---|---|
| 4,873,276 | 10/1989 | Fujii et al. | 524/153 |
| 4,957,966 | 9/1990 | Nishio et al. | 525/66 |
| 5,084,511 | 1/1992 | Abe et al. | 525/68 |
| 5,086,105 | 2/1992 | Abe et al. | 524/492 |
| 5,112,907 | 5/1992 | Nishio et al. | 525/65 |
| 5,147,942 | 9/1992 | Abe et al. | 525/397 |
| 5,175,211 | 12/1992 | Sanada et al. | 525/66 |

FOREIGN PATENT DOCUMENTS

| | | |
|---|---|---|
| 61-204263 | 9/1986 | Japan. |
| 63-35652 | 2/1988 | Japan. |
| 63-101452 | 5/1988 | Japan. |
| 3177454 | 8/1991 | Japan. |

OTHER PUBLICATIONS

Fred *Billmeyer* "Textbook of Polymer Chemistry" 1959, second printing, p. 284.

*Primary Examiner*—Paul R. Michl
*Assistant Examiner*—U. K. Rajguru
*Attorney, Agent, or Firm*—Cushman Darby & Cushman, L.L.P.

[57] ABSTRACT

A blow-molded article made from a polyphenylene ether/polyamide composition reinforced with glass fibers is provided. The article is excellent in mechanical properties and blow moldability. The composition comprises a mixture consisting of (A) 10–65 parts by weight of a polyphenylene ether and (B) 90–35 parts by weight of a polyamide and, on the basis of 100 parts by weight of said mixture, (C) 10–100 parts by weight of a glass fiber, (D) 1–35 parts by weight of a polyolefin and (E) 0.01–10 parts by weight of an unsaturated polar monomer compound having in its molecule both (a) carbon-carbon double bond or carbon-carbon triple bond and (b) carboxyl group, acid anhydride group, amino group, acid amide group, imide group, epoxy group, carboxylic acid ester group, isocyanate group, methylol group or hydroxyl group as a compatibilizing agent, amounts of (C), (D) and (E) being based on 100 parts by weight of [(A)+(B)].

5 Claims, No Drawings

BLOW-MOLDED ARTICLE MADE FROM THERMOPLASTIC RESIN COMPOSITION

This is a continuation of application Ser. No. 08/200,105, filed on Feb. 22, 1994, which was abandoned upon the filing hereof which is a continuation-in-part of application Ser. No. 08/072,959, filed Jun. 8, 1993, abandoned.

BACKGROUND OF THE INVENTION

The present invention relates to a blow-molded article made from a resin composition, and more particularly, to a blow-molded article made from a glass fiber-reinforced resin composition which comprises a polyphenylene ether and a polyamide as main resin components and is excellent in blow characteristics.

Polyphenylene ethers are resins superior in mechanical properties and electric properties and high in heat resistance. However, polyphenylene ethers are inferior in processability and solvent resistance and are considerably limited in their uses.

Polyamides are useful thermoplastic resins superior in processability and mechanical strength and are practically used in various fields, but have the defects such as large water absorption, low dimensional stability and formation of cracks upon contact with salts such as calcium chloride.

Under the circumstances, it is industrially valuable to provide resin compositions having the merits of both the polyphenylene ether and the polyamide by blending these two resins and some proposals have already been made (Japanese Patent 45-997B). Moreover, resin compositions improved in compatibility between polyphenylene ether and polyamide are disclosed in Japanese Patent 60-11966B and 61-10494B and Japanese Patent 59-66452A and 56-49753A.

However, these compositions are insufficient in rigidity and are limited in their use for constructional materials which require a high rigidity.

To enhance the rigidity, incorporation of fillers such as glass fibers has been generally carried out. As such compositions comprising polyphenylene ether and polyamide, there are disclosed materials comprising aliphatic polyamides, polyphenylene ethers and fibrous reinforcing materials used for automobile engine parts (Japanese Patent 63-35652A), resin compositions comprising polyphenylene ethers, polyamides having a crystalline melting point of 265°–320° C., copolymers of styrene compounds and α, β-unsaturated carboxylic acid anhydrides and fibrous, flaky or powdered reinforcing materials (Japanese Patent 61-204263A), resin compositions comprising polyphenylene ethers, polyamides having more terminal amino groups than terminal carboxyl groups, saturated aliphatic polycarboxylic acids, rubber-like materials and fillers (Japanese Patent 62-240354A), resin compositions comprising polyphenylene ethers, polyamides, alkenyl aromatic compound-conjugated diene copolymers, compounds having both unsaturated group and polar group in one molecule and glass fibers (Japanese Patent 63-101452A) and resin compositions comprising polyamides, polyphenylene ethers, styrene-maleic anhydride copolymers, modified polyolefins and glass fibers (Japanese Patent 3-177454A). However, these polyphenylene ether/polyamide compositions reinforced with glass fibers are insufficient in mechanical properties and inferior in plastisizing properties or drawdown properties in blow molding and are not necessarily satisfactory for industrial application.

SUMMARY OF THE INVENTION

The object of the present invention is to provide a blow-molded article made from a glass fiber-reinforced polyphenylene ether/polyamide composition excellent in mechanical properties and blow moldability.

As a result of intensive research conducted by the inventors, it has been found that a combination of a specific compatibilizing agent with a specific polyolefin, and a specific composition of polyolefin, polyamide, glass fiber, said specific compatibilizing agent and said specific polyolefin are decisive factors for obtaining the desired blow-molded article of a resin composition. Thus, the present invention has been accomplished.

That is, the present invention relates to a blow-molded article made from a resin composition comprising:

100 parts by weight of a mixture consisting of (A) 10–65% by weight of a polyphenylene ether and (B) 90–35% by weight of an polyamide, (C) 10–100 parts by weight of glass fibers, (D) 1–30 parts by weight of a polyolefin and (E) 0.01–10 parts by weight of an unsaturated polar monomer compound having in its molecule simultaneously (a) carbon-carbon double bond or carbon-carbon triple bond and (b) carboxyl group, acid anhydride group, amino group, acid amide group, imide group, epoxy group, carboxylic acid ester group, isocyanate group, methylol group or hydroxyl group as a compatibilizing agent. Amounts of (C), (D) and (E) are respectively based on 100 parts by weight of [(A)+(B)].

DESCRIPTION OF THE INVENTION

The polyphenylene ether (A) used in the present invention is a homopolymer or a copolymer composed of the constituent unit represented by the following formula [I] or the constituent unit represented by the formula [I] and the constituent unit represented the following formula [II] as repeating units, a mixture of said homopolymer and said copolymer, a mixture of said polymer with a polystyrene or a graft copolymer of said polymer with styrene or the like:

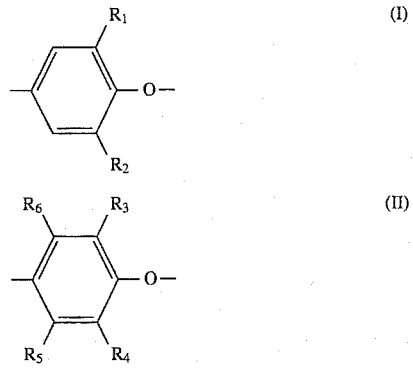

wherein $R_1$, $R_2$, $R_3$, $R_4$, $R_5$ and $R_6$ which may be identical or different each represents a monovalent residue such as an alkyl group of 1–4 carbon atoms excluding tert-butyl group, an aryl group, a halogen atom or a hydrogen atom and $R_3$ and $R_5$ cannot be simultaneously hydrogen atom.

Typical examples of the polyphenylene ether as homopolymers are poly(2,6-dimethyl-1,4-phenylene) ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4phenylene)ether, poly(2-methyl-6-n-butyl-1,4-phenylene)ether, poly(2-ethyl- 6-isopropyl-1,4-phenylene)ether, poly(2-methyl-6-chloro-1,4-phenylene) ether, poly(2-methyl-6-hydroxyethyl-1,4-phenylene)ether and poly(2-methyl-6-chloroethyl-1,4-phenylene)ether.

The polyphenylene ether copolymers include those which are mainly composed of polyphenylene ether structure and which are obtained by copolymerization with o-cresol or an alkyl-substituted phenol such as 2,3,6-trimethylphenol represented by the formula (III).

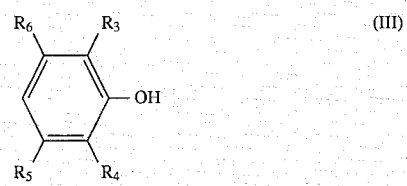

wherein $R_3$, $R_4$, $R_5$ and $R_6$ each represents a monovalent residue such as an alkyl group of 1–4 carbon atoms excluding tert-butyl group, an aryl group, a halogen atom or a hydrogen atom and $R_3$ and $R_5$ cannot be simultaneously hydrogen atom.

The polyamides (B) are crystalline aliphatic polyamides and examples thereof are as shown below.

They have a molecular weight of 10,000 or more and can be prepared by bonding equimolar saturated aliphatic dicarboxylic acid containing 4–12 carbon atoms and aliphatic diamine containing 2–12 carbon atoms. In this case, if necessary, diamines and the like can be used so as to give amine terminal groups in excess of carboxyl terminal groups. On the other hand, dibasic acids can also be used so as to give excess acidic groups. Similarly, these polyamides can also be satisfactorily produced from derivatives which produce said acids or amines such as esters, acid chlorides and amine salts. Representative aliphatic dicarboxylic acids used for producing the polyamides include adipic acid, pimelic acid, azelaic acid, suberic acid, sebacic acid and dodecanedioic acid and representative aliphatic diamines include hexamethylenediamine and octamethylenediamine. In addition, these polyamides can also be produced by self-condensation of lactams. Examples of the polyamides include polyhexamethylene adipamide (nylon 66), polyhexamethylene azelamide (nylon 69), polyhexamethylene sebacamide (nylon 610), polyhexamethylene dodecanoamide (nylon 612), poly-bis-(p-aminocyclohexyl)methane dodecanoamide, polytetramethylene adipamide (nylon 46), polyamides produced by ring cleavage of lactams, namely, polycaprolactam (nylon 6) and polylauryllactam. Furthermore, there may be used polyamides produced by polymerization of at least two amines or acids used for production of the above polymers, such as polymers produced from adipic acid, sebacic acid and hexamethylenediamine. Blends of polyamides such as blends of nylon 66 and nylon 6 include copolymers such as nylon 66/6.

Among these crystalline polyamides, preferred are nylon 46, nylon 6, nylon 66, nylon 11 and nylon 12. More preferred are nylon 6, nylon 66 or mixtures of nylon 6 and nylon 66 at an optional ratio. Regarding the terminal functional groups of these polyamides, suitable are those in which the content of terminal amino groups may be larger or that of terminal carboxyl groups may be larger or the two may be balanced or mixed at an optional ratio.

The glass fibers (C) are those which are known in the art and preferably chopped strands of 15μ or less in fiber diameter and 6 mm or less in fiber length. If the diameter is more than 15μ the improvement of mechanical strength is small. Preferred are glass fibers of 10μ or less in diameter and 3 mm or less in length.

In order to improve the interfacial adhesion and dispersibility of polyphenylene ether resins and/or polyamide resins, various coupling agents may be used together with the glass fibers. The coupling agents generally include silane and titanium coupling agents. Among them, prefered are silane coupling agents, for example, epoxysilanes such as γ-glycidoxypropyltrimethoxysilane, vinylsilanes such as vinyltrichlorosilane and aminosilanes such as γ-aminopropyltriethoxysilane.

The polyolefins (D) are homopolymers or copolymers of olefins or copolymers of olefins with other monomers. Examples of the polyolefins are homopolymers of α-olefins such as polyethylene, polypropylene, polybutene and polyisobutylene; homopolymers of dienes such as natural rubber, polybutadiene, polyisoprene and polychloroprene; copolymers of olefins such as ethylene-propylene copolymer, ethylene-propylene-diene copolymer, ethylene-butene copolymer, ethylene-butene-diene copolymer, ethylene-pentene copolymer and ethylene-hexene copolymer; and copolymer of olefins with other monomers such as ethylene-acrylate ester copolymers, butadiene-acrylonitrile copolymer, butadiene-styrene copolymers, isoprene-styrene copolymers including various block, graft and random copolymers and hydrogenated products thereof. Additionally, modified products obtained by reacting these polyolefins with reactive compounds such as unsaturated carboxylic acids or derivatives thereof are also included in the polyolefins used in the present invention. The preferable polyolefins are homopolymers of α-olefins, copolymers of α-olefins and modified products of these polymers. More preferred are ethylene-α-olefin copolymers and modified products thereof. The most preferable polyolefins are ethylene-butene-1 copolymers and modified products thereof.

The polyolefin (D) can be a polyolefin which is not compatible with the polyphenylene ether (A).

The compatibilizing agents (E) are unsaturated polar monomer compounds having in their molecules simultaneously (a) carbon-carbon double bond or carbon-carbon triple bond and (b) carboxyl group, acid anhydride group, amino group, acid amide group, imide group, epoxy group, carboxylic acid ester group, isocyanate group, methylol group or hydroxyl group. As examples of these compounds, mention may be made of maleic anhydride, maleic acid, fumaric acid, maleimide, maleic hydrazide, reaction products of maleic anhydride and diamines, for example, those having the structure represented by the following formula:

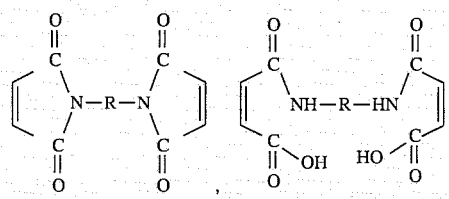

wherein R represents an aliphatic or aromatic group, methyl nadic anhydride, dichloromaleic anhydride, maleinimide; natural fats and oils such as soybean oil, tung oil, caster oil, linseed oil, hempseed oil, cottonseed oil, sesame oil, rapeseed oil, peanut oil, tsubaki oil, olive oil, coconut oil, and sardine oil; epoxidized natural fats and oils such as epoxidized soybean oil; unsaturated carboxylic acids such as acrylic acid, butenoic acid; crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinoleic acid, eleostearic acid, oleic acid, eicosapentaenoic acid, docosadienoic acid, docosatrienoic acid, docosatetraenoic acid, docosapentaenoic acid, tetracosenoic acid, hexacosenoic acid, hexacodienoic acid, octacosenoic acid and tetracontenoic acid, esters, acid amides and anhydrides of these unsaturated carboxylic acids; alcohols such as allyl alcohol, crotyl alcohol, methylvinylcarbinol, allylcarbinol, methylpropenylcarbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$, and $C_nH_{2n-9}OH$, wherein n is a positive integer; unsaturated alcohols such as 3-butene-1,2-diol, 2,5-dimethyl-3-hexene-2,5-diol, 1,5-hexadiene-3,4-diol, and 2,6-octadiene-4,5-diol; unsaturated amines prepared by substituting the OH group of these unsaturated alcohols with —$NH_2$ group; glycidyl acrylate, glycidyl methacrylate, and allyl glycidyl ether.

It is needless to say that the compounds used as the compatibilizing agents include compounds containing two or more functional groups of the above (a) and two or more identical or different functional groups of the above (b). It is also possible to use two or more of these compounds. Among them, suitable are maleic anhydride, maleic acid, fumaric acid, itaconic acid, himic anhydride, glycidyl acrylate, glycidyl methacrylate and allyl glycidyl ether.

The mixing ratio of the components in the resin composition of the present invention is as follows: 10–100 parts by weight of the glass fiber (C), 1–35 parts by weight of the polyolefin (D) and 0.01–10 parts by weight of the compatibilizing agent (E) on the basis of 100 parts by weight in total of 10–65 parts by weight of the polyphenylene ether (A) and 90–35 parts by weight of the polyamide (B), namely, on the basis of [(A)+(B)] and preferably, 15–80 parts, more preferably 15–65 parts by weight of the glass fiber (C), 3–25 parts by weight of the polyolefin (D) and 0.1–5 parts by weight of the compatibilizing agent (E) on the basis of 100 parts by weight in total of 25–60 parts by weight of the polyphenylene ether (A) and 75–40 parts by weight of the polyamide (B).

The resin composition of the present invention may further contain inorganic fillers, pigments, ultraviolet absorbers, heat stabilizers, antioxidants, other resins such as polystyrene, plasticizers and the like.

There is no limitation in the method of blending (A) polyphenylene ether, (B) polyamide, (C) glass fiber, (D) polyolefin and (E) compatibilizing agent and any known melt kneading methods can be employed. Extruders, kneaders, rolls and the like can be used as melt kneading apparatuses and especially preferred are extruders. There is also no special limitation in the sequence of adding the respective components in melt kneading.

That is, there may be employed any of the following methods: a method of simultaneously adding the components (A), (B), (C), (D) and (E) and melt kneading them together; a method of previously melt kneading the components (A), (D) and (E) in the presence or absence of a radical initiator and then adding thereto the components (S) and (C), followed by melt kneading them; a method of previously melt kneading the components (A), (C), (D) and (E) in the presence or absence of a radical initiator and then adding thereto the component (B), followed by melt kneading them; and a method of previously melt kneading the components (A), (D) and (E), then adding thereto the component (B) and further adding thereto the component (C), followed by melt kneading them. However, preferably the polyphenylene ether and the compatibilizing agent are kneaded at least before the polyamide is kneaded.

The following examples are set forth for purposes of illustration of the present invention. It should be understood that they are exemplary only, and should not be construed as limiting the invention in any manner. The test methods for evaluation of the properties employed in the examples were as follows:

Blow Moldability (1) Parison properties: A parison is extruded at 170 g/min and at 270° C. from a 50 mmφ blow molding machine manufactured by The Japan Steel Works, Ltd. and the length of the parison immediately before the falling rate of the parison begins to abruptly increase by gravity or the like (critical parison length) is measured. The longer critical parison length means the better parison properties.

(2) Plasticizing properties: Cylinder preset temperature at which the metering time is stabilized is obtained under the following conditions using Sumitomo Nestal injection molding machine SICAP 110/50 (manufactured by Sumitomo Heavy Industries Ltd.). The lower preset temperature means the better plasticizing properties, Screw torque: 13 Kqfm Screw revolution speed: 50 rpm Metering stroke: 68 mm Cylinder preset temperature: Temperature elevated from 225° C. at an interval of 5° C. (Nozzule temperature is constant at 260° C.)

Mechanical properties: A test piece is prepared by IS220E injection molding machine manufactured by Toshiba Machine Co., Ltd.

(1) Flexural modulus=ASTM D790
(2) Flexural strength: ASTM D790
(3) Izod impact strength: ASTM D256 (A notched test piece having a thickness of 3.2 m)

EXAMPLE 1

Fifteen parts by weight of polyphenylene ether having an intrinsic viscosity of 0.57 measured in a chloroform solution having a concentration of 0.5 g/dl at 30° C. 0.3 part by weight of maleic anhydride (MAH) as a compatibilizing agent, and 3.5 parts by weight of maleic anhydride-modified polypropylene resin (m-PP) and 14 parts by weight of polypropylene resin (PP) as polyolefins were introduced from the first hopper of a continuous twin-screw kneader (TEM 50 manufactured by Toshiba Machine Co., Ltd.) and furthermore, 35 parts by weight of a polyamide (Unitika Nylon A1030BRT®) and 30 parts by weight of glass fiber (RESO3TP64 manufactured by Nippon Glass Fiber Co., Ltd.) were introduced from the second hopper provided between the first hopper and a vent hole using a weigh-feeder and these were melt kneaded at a screw revolution speed of 330 rpm with setting the cylinder temperature at 260° C. and pelletized. Mechanical properties of the resulting composition were measured.

EXAMPLE 2

Thirty-five parts by weight of polyphenylene ether having an intrinsic viscosity of 0.57 measured in a chloroform solution having a concentration of 0.5 g/dl at 30° C., 0.3 part by weight of maleic anhydride as a compatibilizinq agent, and 5 parts by weight of ethylene-butene-1 copolymer (EBR) having a butene-1 content of 18% by weight and a 100° C. Mooney viscosity $ML_{1+4}$ 100 of 30 prepared by homogeneous solution polymerization in accordance with the method described in Japanese Patent 44-9390B as a polyolefin were introduced from the first hopper of a continuous twin-screw kneader (TEM 50 manufactured by Toshiba Machine Co., Ltd.) and furthermore, 45 parts by weight of a polyamide (Unitika Nylon A1030BRT®) and 15 parts by weight of glass fiber (RES03TP64 manufactured by Nippon Glass Fiber Co., Ltd.) were introduced from the second hopper provided between the first hopper and a vent hole using a weigh-feeder and these were melt kneaded at a screw revolution speed of 330 rpm with setting the cylinder temperature at 260° C. and pelletized. Mechanical properties, parison properties and plasticizing properties of the resulting composition were measured.

EXAMPLE 3

A resin composition was prepared at the same blending ratio and extrusion conditions as in Example 2 except that a maleic anhydride-modified ethylene-butene-1 copolymer having a grafting amount of maleic anhydride of 1.0 wt % (based on the rubber) (m-EBR) was used as the ethylene-butene-1 copolymer. The resulting resin composition was evaluated.

COMPARATIVE EXAMPLE 1

A resin composition was prepared at the same blending ratio and extrusion conditions as in Example 1 except that 3.5 parts by weight of styrene-maleic anhydride copolymer (DILARK 232 manufactured by Sekisui Kaseihin Kogyo Co.) was used as the compatibilizing agent. The resulting composition was evaluated.

COMPARATIVE EXAMPLE 2

A resin composition was prepared at the same blending ratio and extrusion conditions as in Example 2 except that the ethylene-butene-1 copolymer was not added. The resulting resin composition was evaluated

EXAMPLE 4

A resin composition was prepared at the same blending ratio and extrusion conditions as in Example 2 except that a maleic anhydride-modified ethylene-propylene copolymer [SUMITOMO ESPRENE® E120P having a grafting amount of maleic anhydride of 1.5 wt % (based on the rubber) (m-EPR)] was used as the polyolefin. The resulting resin composition was evaluated.

These results were shown in Table 1.

COMPARATIVE EXAMPLE 3

Forty-one parts by weight of polyphenylene ether having an intrinsic viscosity of 0–57 measured in a chloroform solution having a concentration of 0.5 g/dl at 30° C., 0.3 part by weight of maleic anhydride as a compatibilizing agent, and 6 parts by weight of m-EBR were introduced from the first hopper of a continuous twin-screw kneader (TEM 50 manufactured by Toshiba Machine Co., Ltd.), and furthermore 53 parts by weight of polyamide (Unitika Nylon A1030BRT®) was introduced from the second hopper provided between the first hopper and a vent hole, using a weigh-feeder, and these were melt kneaded at a screw revolution speed of 330 rpm setting the cylinder temperature at 260° C. and pelletized. Mechanical properties, parison properties and plasticizing properties of the resulting composition were measured.

COMPARATIVE EXAMPLE 4

Thirty-seven parts by weight of polyphenylene ether having an intrinsic viscosity of 0.57 measured in a chloroform solution having a concentration of 0.5 g/dl at 30° C., 0.3 part by weight of maleic anhydride as a compatibilizing agent and 5 parts by weight of m-EBR were introduced from the first hopper of a continuous twin-screw kneader (TEM 50 manufactured by Toshiba Machine Co., Ltd. ), and furthermore 53 parts by weight of polyamide (Unitika Nylon A1030BRT®) and 5 parts by weight of glass fiber (RES03TP64 manufactured by Nippon-Glass Fiber. Co., Ltd.) were introduced from the second hopper provided between the first hopper and a vent hole, using a weigh-feeder, and these were melt kneaded at a screw revolution speed of 330 rpm setting the cylinder temperature at 260° C. and pelletized. Mechanical properties, parison properties and plasticizing properties of the resulting composition were measured.

EXAMPLE 5

Thirty-four parts by weight of polyphenylene ether having an intrinsic viscosity of 0.57 measured in a chloroform solution having a concentration of 0.5 g/dl at 30° C., 0.2 part by weight of maleic anhydride as a compatibilizing agent, and 5 parts by weight of m-EBR were introduced from the first hopper of a continuous twin-screw kneader (TEM 50 manufactured by Toshiba Machine Co., Ltd.) and, furthermore 51 parts by weight of polyamide (Unitika Nylon AI030BRT®) and 10 parts by weight of glass fiber (RES03TP64 manufactured by Nippon Glass Fiber Co., Ltd.) were introduced from the second hopper provided between the first hopper and a vent hole, using a weigh-feeder, and these were melt kneaded at a screw revolution speed of 330 rpm setting the cylinder temperature at 260° C. and pelletized. Mechanical properties, parison properties and plasticizing properties of the resulting composition were measured.

EXAMPLE 6

A resin composition was prepared at the same extrusion conditions as in Example 5 except that 32 parts by weight of the polyphenylene ether, 48 parts by weight of the polyamide and 15 parts by weight of the glass fiber were used in place of 34, 51 and 10 parts, respectively. The resulting resin composition was evaluated.

These results were shown in Table 2.

TABLE 1

|  | Example 1 | Example 2 | Example 3 | Example 4 | Comparative Example 1 | Comparative Example 2 |
|---|---|---|---|---|---|---|
| Polyphenylene ether (part) | 15 | 35 | 35 | 35 | 15 | 35 |
| Polyamide (part) | 35 | 45 | 45 | 45 | 35 | 45 |
| Polyolefin (part) | m-pp/pp 17.5 | EBR 5 | m-EBR 5 | m-EPR 5 | m-pp/pp 17.5 | — |
| Glass fiber (part) | 30 | 15 | 15 | 15 | 30 | 15 |
| Compatibilizing agent (part) | MAH 0.3 | MAH 0.3 | MAH 0.3 | MAH 0.3 | DILARK 232 3.5 | MAH 0.3 |
| Flexural modulus (Kg/cm$^2$) | 74,000 | 44,000 | 44,000 | 43,000 | 68,000 | 46,000 |
| Flexural strength (Kg/cm$^2$) | 1,740 | 1,300 | 1,300 | 1,200 | 1,280 | 1,500 |
| Izod Impact strength (Kg · cm/cm) | 8 | 10 | 10 | 9 | 5 | 8 |
| Critical parison length (mm) | — | 500 | 550 | 450 | — | 420 |
| Plasticizing properties (°C.) | — | 230 | 230 | 230 | — | 265 |

TABLE 2

|  | Comparative Example 3 | Comparative Example 4 | Example 5 | Example 6 |
|---|---|---|---|---|
| Polyphenylene ether (part) | 41 | 37 | 34 | 32 |
| Polyamide (part) | 53 | 53 | 51 | 48 |
| Polyolefin (part) | m-EBR 6 | m-EBR 5 | m-EBR 5 | m-EBR 5 |
| Glass fiber (part) | — | 5 | 10 | 15 |
| Compatibilizing agent (part) | MAH 0.3 | MAH 0.3 | MAH 0.2 | MAH 0.2 |
| Flexural modulus (Kg/cm$^2$) | 22,000 | 27,000 | 33,000 | 40,000 |
| Flexural strength (Kg/cm$^2$) | 920 | 1,100 | 1,200 | 1,300 |
| Izod Impact strength (Kg · cm/cm) | 9 | 9 | 10 | 11 |
| Critical parison length (mm) | 400 | 420 | 500 | 500 |
| Plasticizing properties (°C.) | 230 | 230 | 230 | 230 |

The resin compositions prepared in examples are molded into various parts by blow molding method and can be put on the market. The parts to which the resin compositions are applied are automobile parts such as air ducts, resonators and the like.

What is claimed is:

1. A blow-molded article made from a thermoplastic resin composition which comprises a mixture consisting of (A) 10–65 parts by weight of a polyphenylene ether and (B) 90–35 parts by weight of a polyamide, (C) 10–100 parts by weight of a glass fiber, (D) 3–20 parts by weight of a polyolefin and (E) 0.01–10 parts by weight of an unsaturated polar monomer compound having in its molecule simultaneously (a) carbon-carbon double bond or carbon-carbon triple bond and (b) carboxyl group, acid anhydride group, amino group, acid amide group, imide group, epoxy group, carboxylic acid ester group, isocyanate group, methylol group or hydroxyl group as a compatibilizing agent, said amounts of (C), (D) and (E) are respectively on the basis of 100 parts by weight of a mixture of (A) and (B), wherein said thermoplastic resin composition has a critical parison length of 450 to 550 mm when it is blow-molded using a 50 mm φ blow-molding machine at an extrusion rate of 170 g/minute and at a temperature of 270° C.

2. A blow-molded article according to claim 1 wherein the polyolefin (D) is a polyolefin which is not compatible with the polyphenylene ether.

3. A blow-molded article according to claim 1 wherein the polyolefin (D) is a copolymer of a modified or unmodified ethylene and an α-olefin.

4. A blow-molded article according to claim 1 wherein the polyolefin (D) is a copolymer of a modified or unmodified ethylene and butene-1.

5. A blow-molded article according to claim 1 wherein the amount of the glass fiber (C) is 15–80 parts by weight on the basis of 100 parts by weight of the mixture (A) and (B).

* * * * *